(12) United States Patent
Bulfer

(10) Patent No.: US 6,208,966 B1
(45) Date of Patent: Mar. 27, 2001

(54) TELEPHONE NETWORK SERVICE FOR CONVERTING SPEECH TO TOUCH-TONES

(75) Inventor: Andrew Frederick Bulfer, Mountain Lakes, NJ (US)

(73) Assignee: AT&T Corp., New York, NY (US)

(*) Notice: Subject to any disclaimer, the term of this patent is extended or adjusted under 35 U.S.C. 154(b) by 505 days.

(21) Appl. No.: 08/867,773

(22) Filed: Jun. 2, 1997

Related U.S. Application Data

(63) Continuation-in-part of application No. 08/536,296, filed on Sep. 29, 1995.

(51) Int. Cl.[7] .................................................. G10L 15/00
(52) U.S. Cl. .................................... 704/251; 379/88.01
(58) Field of Search .............................. 395/26; 379/201, 379/67

(56) References Cited

U.S. PATENT DOCUMENTS 4,827,500 * 5/1989 Binkerd et al. ..................... 379/88

* cited by examiner

Primary Examiner—Fan Tsang
Assistant Examiner—Michael N. Opsasnick
(74) Attorney, Agent, or Firm—Robert B. Levy

(57) ABSTRACT

A telecommunications network service for converting spoken words to individual DTMF (e.g., touch-tone) signals to be furnished to an automated system responsive to touch-tone control thereof. In accordance with one illustrative embodiment of the invention, a telephone user speaks an utterance comprising a word representing a digit, letter, the "*" key (e.g., the word "star") or the "#" key (e.g., the word "pound"). The illustrative network service performs conventional, speaker independent speech recognition on the utterance to identify the spoken word and then generates the touch-tone signal which corresponds to the spoken word so identified (e.g., a digit, letter or special character as found on a conventional touch-tone telephone). This generated DTMF signal is then transmitted to an automated system such as a voice messaging system or telephone answering machine to control the operation thereof. The network service of the present invention may be advantageously employed when the telephone being used by the caller is a rotary or dial pulse type telephone, or in other circumstances where it may be preferable to speak rather than to press the keys of a telephone keypad.

9 Claims, 2 Drawing Sheets

TELEPHONE NETWORK SERVICE FOR CONVERTING SPEECH TO TOUCH-TONES

This application is a continuation of application Ser. No. 08/536,296, filed on Sep. 29, 1995.

FIELD OF THE INVENTION

The present invention relates generally to the field of telecommunications and more particularly to a method for providing a speech-based interface to DTMF (Dual Tone Multi-frequency) controlled systems.

BACKGROUND OF THE INVENTION

In recent years, the telecommunications industry has seen an explosive growth in the use of DTMF (i.e., touch-tone) controlled systems. These systems have typically been employed either for the purpose of providing added user convenience or accessibility to information, or to reduce or eliminate the need for human telephone operators. For example, voice messaging systems often may be accessed with use of touch-tones to enable a caller to retrieve his or her messages or to record outgoing greeting messages or perform other administrative tasks. Even home-based telephone answering machines now routinely provide remote access from any telephone through touch-tone control. In addition, many customer service telephone numbers present touch-tone controlled menus to the caller, where the menus can be used to efficiently provide a connection to the appropriate person or department. Moreover, touch-tones are used to control many other automated systems, such as, for example, automated banking transaction and stock quotation services. These services often enable a caller to perform an entire transaction without involving a human participant on the other side of the call.

Although the fraction of telephones without touch-tone capability (i.e., rotary or dial pulse type telephones) is small and declining in the United States, there are still a substantial number of such telephones, especially outside of the United States. Moreover, many modern touch-tone telephones—including, for example, most cordless and cellular telephones—provide the keypad in the handset, thereby making it extremely cumbersome for a user to provide the required control signals to such an automated touch-tone based system while continuing to listen to the responses from the system. Thus, the use of these automated systems with typical cordless or cellular telephones often involves frequent back and forth movement of the handset which can become quite annoying. In addition, many telephone users, even those who are not facing any of the above-mentioned limitations, would find it more convenient if they could merely speak a command, rather than having to locate and then press an appropriate key with their finger.

Meanwhile, speech recognition technology has advanced substantially over the last several years. It is now technologically straightforward to provide speaker independent speech recognition (i.e., recognition of speech from any speaker previously unknown to the system) on individual words selected from a modest vocabulary. In fact, some of the aforementioned automated systems provide such speech recognition capability, eliminating the need for the user to press touch-tone keys. On the other hand, it may still be quite a while before the vast majority of these systems will have incorporated speech recognition capability to replace (or supplement) their present touch-tone control mechanisms, since, for example, the investment required to add speech recognition capability to such a system may not be justifiable on the basis of a single individual system alone.

It would be advantageous, therefore, to provide a generalized capability enabling the user of a telephone to speak a word representing a digit (or letter) key, the "*" key (e.g., the word "star") or the "#" key (e.g., the word "pound"), and to have the corresponding DTMF signal (i.e., touch-tone) automatically generated in order to provide the required input to an arbitrary touch-tone controlled system. U. S. Pat. No. 5,402,477, issued to Michael L. McMahan and Michele B. Gammel on Mar. 28, 1995, discloses a telephone set which, inter alia, includes the capability of generating touch-tone signals in response to a digit, the word "star," or the word "pound," orally spoken by the user into the handset. But to make use of this capability, it is obviously necessary that this particular specialized telephone terminal equipment as disclosed therein be available to the user. As such, the approach of U.S. Pat. No. 5,402,477 clearly does not provide a solution to the problem described above and addressed herein—namely, that many telephone calls are, in fact, currently being placed either with rotary or pulse type telephones or with touch-tone telephones whose keypads are located in the handset, and will continue to be so for the foreseeable future.

SUMMARY OF THE INVENTION

The present invention provides a telecommunications network service for converting spoken words to individual DTMF (e.g., touch-tone) signals to be furnished to an automated system responsive to touch-tone control thereof. In accordance with one illustrative embodiment of the invention, a telephone user speaks an utterance comprising a word representing a digit, letter, the "*" key (e.g., the word "star") or the "#" key (e.g., the word "pound"). The illustrative network service performs conventional, speaker independent speech recognition on the utterance to identify the spoken word and then generates the touch-tone signal which corresponds to the spoken word so identified (e.g., a digit, letter or special character as found on a conventional touch-tone telephone). This generated DTMF signal is then transmitted to an automated system such as a voice messaging system or telephone answering machine to control the operation thereof. The network service of the present invention may be advantageously employed when the telephone being used by the caller is a rotary or dial pulse type telephone, or in other circumstances where it may be preferable to speak rather than to press the keys of a telephone keypad.

DETAILED DESCRIPTION

Figure 1:
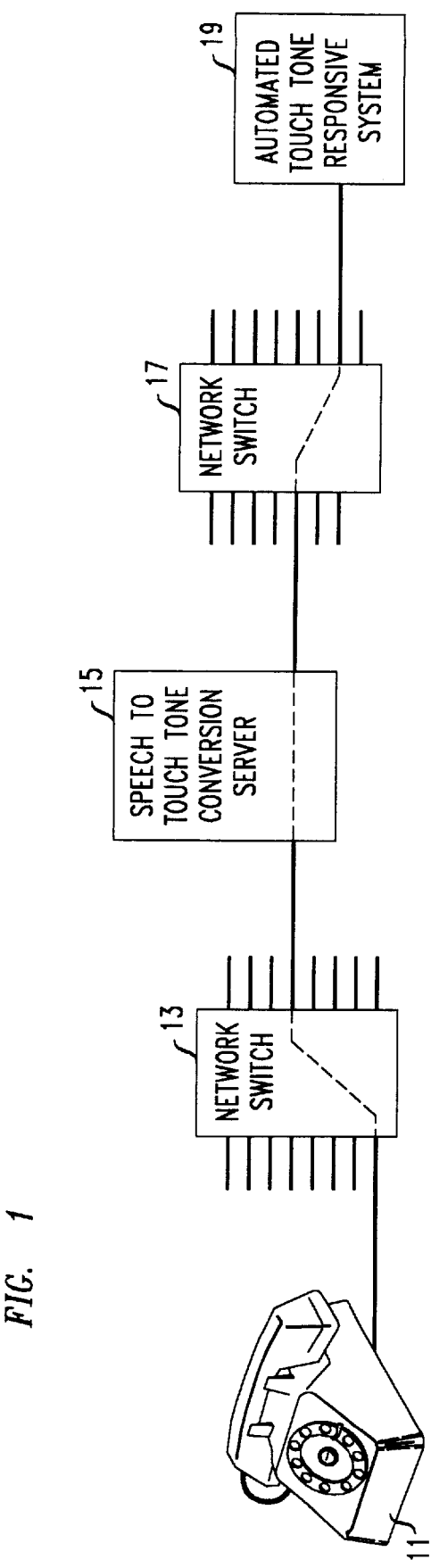
FIG. 1 shows an illustrative telecommunications network in which a speech to touch-tone conversion network service has been provided in accordance with an illustrative embodiment of the present invention.

FIG. 1 shows an illustrative telecommunications network in which a speech to touch-tone conversion network service has been provided in accordance with an illustrative embodiment of the present invention. A caller uses telephone 11 in a conventional manner to place a telephone call to a particular telephone number which has been assigned to speech to touch-tone conversion server 15. Telephone 11 may be any type of conventional telephone, although the use of the present invention will be found to be particularly advantageous if telephone 11 is a rotary or dial pulse type telephone, or, alternatively, a touch-tone telephone such as a cordless or cellular telephone wherein the touch-tone keypad is located in the handset. In response to the placement of the call by telephone 11, telecommunications network switch 13 interconnects telephone 11 with speech to touch-tone conversion server 15. Telecommunications network switch 13 may be a conventional long distance or local exchange telecommunications switch, familiar to those of ordinary skill in the art.

Once the call between telephone 11 and speech to touch-tone conversion server 15 has been connected, the server requests that the user provide the telephone number of an automated system responsive to touch-tone control thereof, such as a voice mail system, a telephone answering machine, or an automated transaction service such as a banking or stock quotation service. The requested telephone number may be provided in a conventional manner (i.e., by dialing), or it may be provided orally by the caller. In the latter case, conventional speech recognition techniques may be used to determine the sequence of digits which comprises the telephone number of the desired automated system. In the illustrative embodiment of FIG. 1, the user specified telephone number is that of automated touch-tone responsive system 19.

Once the server has been provided with the telephone number to which the caller wishes to be connected, it may use any of a number of conventional techniques known to those skilled in the art to effectuate a connection between the caller and automated touch-tone responsive system 19, with the server itself interposed therebetween. In the illustrative embodiment of FIG. 1, for example, such a connection is established via telecommunications network switch 17, which, like telecommunications network switch 13, may be a conventional long distance or local exchange telecommunications switch. (Note that network switch 17 may, in fact, be the same switch as network switch 13.)

In one embodiment, for example, the functionality of speech to touch-tone conversion server 15 may be provided with use of a PBX (private branch exchange) system which is directly connected to network switch 17. This connection between the PBX and the network switch may, for example, comprise a set of T1 trunk lines, familiar to those of ordinary skill in the art, and may use conventional digital signalling techniques to communicate therebetween. In particular, speech to touch-tone conversion server 15 may be connected on the line side of the aforementioned PBX as if it were one or more telephone sets. (Note that speech to touch-tone conversion server 15 may, in general, comprise a plurality of ports, thereby enabling its simultaneous use by a number of individual callers, each caller communicating with an individually associated automated touch-tone responsive system.)

In use, the call from telephone 11 to server 15 may be set up through the aforementioned PBX. In this manner, the caller will be connected to a first line of the server. Then, as described above, speech to touch-tone conversion server 15 requests from the caller the telephone number of automated touch-tone responsive system 19. Once the server has received that number, it accesses a second line (to the PBX) and requests that the PBX system dial the call to the automated system, connecting the server thereto. The server then instructs the PBX to conference the first line and the second line together, thereby resulting in the caller being connected to the automated system with the server interposed therebetween. At this point, the server is poised to provide speech to touch-tone conversion in accordance with an illustrative embodiment of the present invention as described below.

Figure 2:
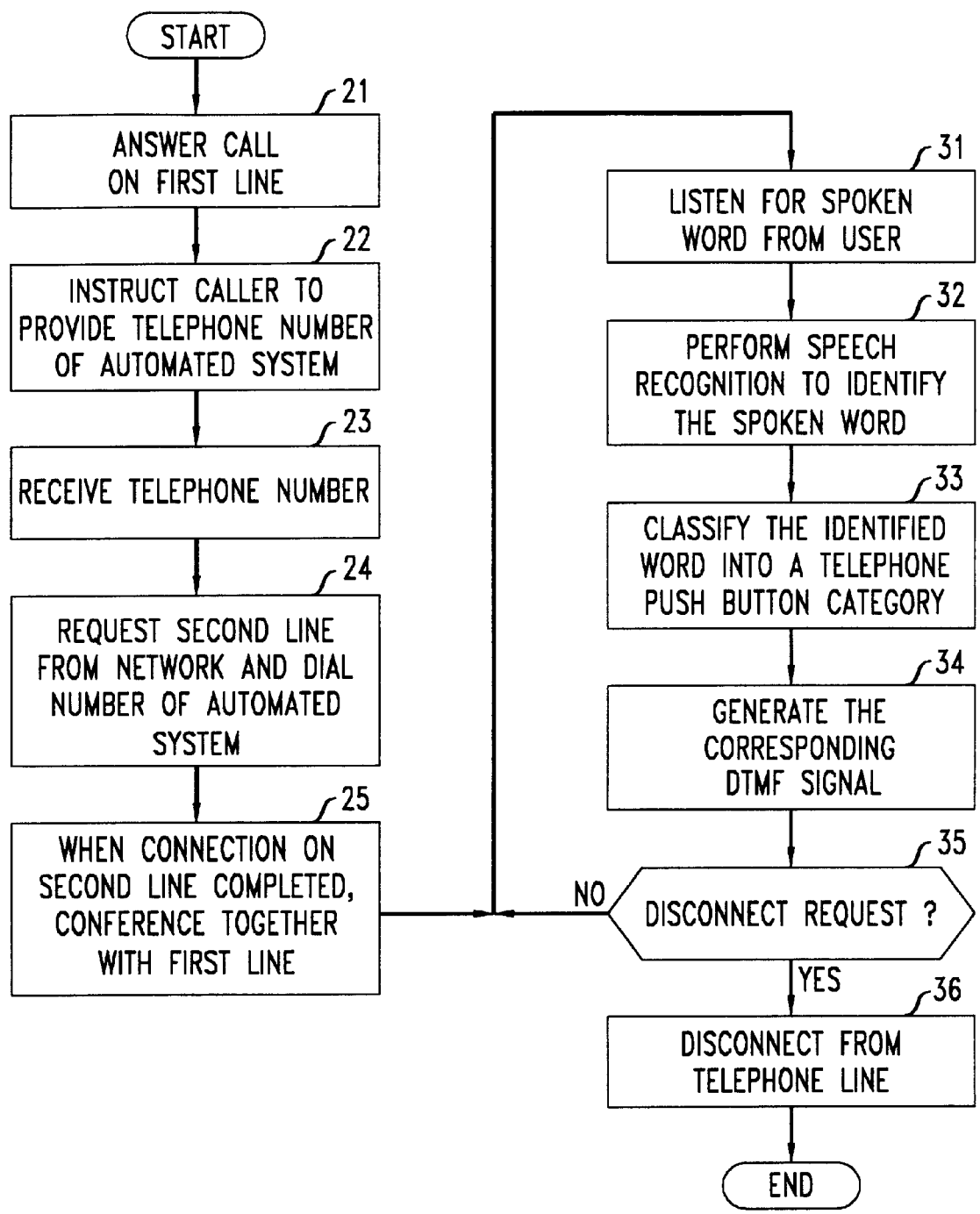
FIG. 2 shows a flow chart describing the operation of the illustrative speech to touch-tone conversion server of FIG. 1 in accordance with an illustrative embodiment of the present invention.

FIG. 2 shows a flow chart describing the operation of the illustrative speech to touch-tone conversion server of FIG. 1 in accordance with an illustrative embodiment of the present invention. Specifically, steps 21–25 perform the process of interconnecting the caller with the user specified telephone number as described above, with the server interposed between the caller and the called number. In step 21, speech to touch-tone conversion server 15 answers the incoming call (on what will be referred to herein as the "first" line). Step 22 then instructs the caller to provide the telephone number of automated touch-tone responsive system 19—the automated system to which the caller wishes to be connected. In step 23, the server receives the telephone number from the caller. As described above, this may, for example, comprise the conventional recognition of speech utterances which specify the number, or it may comprise other conventional techniques such as the receipt of incoming touch-tones.

Once speech to touch-tone conversion server 15 has received the telephone number to be called, it requests a second (outgoing) line from the telephone network, and dials thereon the user-provided number of the automated touch-tone responsive system (step 24). And, finally, when the connection on the second line has been completed, the server causes the two lines (i.e., the first line which includes the caller and the second line which includes the automated system) to be "conferenced" together (i.e., interconnected) in step 25. This may be accomplished either internally within the server, or the server may instruct the telephone network to merge the two lines into a single interconnected line. In any event, at this point, the server is poised to provide speech to touch-tone conversion in accordance with an illustrative embodiment of the present invention as shown in steps 31–34.

Specifically, steps 31 through 34 provide speech to touch-tone conversion as needed until the server is disconnected from the call by the caller (or until the call itself becomes disconnected by either party) as determined by decision 35. In particular, step 31 listens for a spoken word from the user. Note that for many automated touch-tone responsive systems, the only speech the caller is likely to produce is that provided in accordance with the present invention for the purpose of generating touch-tones. Thus, in such a case, it may be advantageously presumed that the spoken word is one which represents either the digits "0" through "9, " the letters "A" through "Z," or one of the special character found on conventional touch-tone telephones (i.e., "*" or "#"). However, for systems which ultimately may connect the caller to another person, for example, the caller may advantageously be provided with a mechanism for disconnecting the server from the call before the call itself has been disconnected, thereby eliminating the possibility that the server will erroneously attempt to generate DTMF tones in response to conversational speech by the caller.

As the word for each digit or letter is uttered, speech to touch-tone conversion server 15 performs conventional, speaker independent speech recognition on the spoken utterance in step 32, thereby identifying the spoken word as one of the words representing the digits "0" through "9," the letters "A" through "Z," or one of the special characters "*" or "#." In particular, the set of words used to represent the digits may, for example, include the words "one," "two," "three," "four," "five," "six," "seven," "eight," "nine," "zero" and "oh." Similarly, the set of words used to represent the character "*" may include the words "star" and "asterisk," and the set of words used to represent the character "#" may include the words "pound," "sharp" and "number." Moreover, words in languages other than English may obviously be provided either in addition to or instead of the familiar English words for the digits, letters and special characters. Based on the above-described speech recognition process, step 33 classifies the identified word into the appropriate telephone push button category.

Once the spoken word has been identified and classified, the server then employs a DTMF signal generator to generate the touch-tone signal which corresponds to the given telephone push button category (step 34), thereby providing the necessary input to the automated system. For example, if the identified word is either "two," "A," "B," or "C," the touch-tone signal which has been assigned to the digit "2" for use in touchtone based telecommunications signalling will be appropriately generated. (As is well known to those skilled in the art, DTMF or touch-tone signals comprise a matrix combination of two frequencies, each from a group of four, which are used in the operation of push button telephone sets to transmit numerical address information. Specifically, the two groups of four frequencies have been standardized to be 697 Hz, 770 Hz, 852 Hz, and 941 Hz, and 1209 Hz, 1336 Hz, 1477 Hz, and 1633 Hz.)

As pointed out above, the server provides speech to touch-tone conversion continuously as needed until the caller requests that the server be removed from the call, at which point the server disconnects itself from the line (i.e., both the first line and the second line) in step 36. (The server will also advantageously disconnect itself from the line when the caller hangs up.) Such a request can be communicated to the server in a number of possible ways. For example, the word "disconnect" can be added to the vocabulary of the server's speech recognition capability, and upon recognizing that the word "disconnect" has been spoken by the caller, the server disconnects itself from the call. Many other possible mechanisms for terminating the server's participation in the call will be obvious to those skilled in the art.

Although a specific embodiment of this invention has been shown and described herein, it is to be understood that this embodiment is merely illustrative of the many possible specific arrangements which can be devised in application of the principles of the invention. Numerous and varied other arrangements can be devised in accordance with these principles by those of ordinary skill in the art without departing from the spirit and scope of the invention. For example, numerous alternative mechanisms may be employed for interconnecting a calling party with an automated system responsive to touch-tone control, with a speech to touch-tone conversion capability interposed therebetween, at which point the principals of the present invention may be used to convert spoken words to touch-tones for use by the automated system. In addition, some or all of the functions of speech to touch-tone conversion server 15 as described in the illustrative embodiment shown herein may, for example, be incorporated directly into one or more telecommunications network switches (such as switches 13 and/or 17 of FIG. 1), or they may be provided within the telecommunications network by any of a number of other possible mechanisms obvious to those skilled in the art. Moreover, as pointed out above, speech to touch-tone conversion server 15 may be provided with the capability of simultaneously handling a plurality of independent telephone calls, thereby providing a generally available network service.

What is claimed is:

1. A method for providing a telecommunications network service performed within a telecommunications network for use with an automated system responsive to Dual-Tone Multi-Frequency (DTMF) signals (touch-tones), the method comprising the steps of:

prompting the caller to initiate a first call to the automated system initiating a second call in the network to a facility for performing speech recognition;

bridging the first and second calls;

receiving the spoken utterance comprising the spoken word;

performing speech recognition on the spoken utterance, thereby identifying the spoken word;

classifying the spoken utterance into one of a set of categories based on said identification of the spoken word, each of said categories having a DTMF signal associated therewith;

generating, within the telecommunications network, the DTMF signal associated with the category into which said spoken utterance has been classified; and transmitting the generated DTMF signal though the telecommunications network to the automated system.

2. The method of claim 1 wherein the set of categories comprises the digits "0" through "9", the character "*", and the character "#", and wherein the associated DTMF signals comprise touch-tone signals which have been correspondingly assigned to the digits "0" through "9", the character "*", and the character "#", respectively, for use in touch-tone based telecommunications signalling.

3. The method of claim 2 wherein the spoken word is identified from a set comprising words representing digits "0" through "9."

4. The method of claim 3 wherein the words representing the digits "0" through "9" comprise words "oh or zero," "one," "two," "three," "four," "five," "six," "seven," "eight," and "nine," respectively.

5. The method of claim 2 wherein the spoken word is identified from a set comprising words representing alphabetic letters "A" through "Z."

6. The method of claim 2 wherein the spoken word is identified from a set comprising words representing "*" and "#".

7. The method of claim 6 wherein the words representing "*" and "#" comprise the words "star," and "asterisk," and the words "pound, and "sharp" and "number," respectively.

8. The method of claim 2 wherein the automated system comprises a voice messaging system.

9. The method of claim 8 wherein the voice messaging system comprises a telephone answering machine.

* * * * *